March 25, 1958 W. J. GRUEN 2,828,419
AUTOMATIC FREQUENCY CONTROL SYSTEM
Filed Oct. 11, 1954
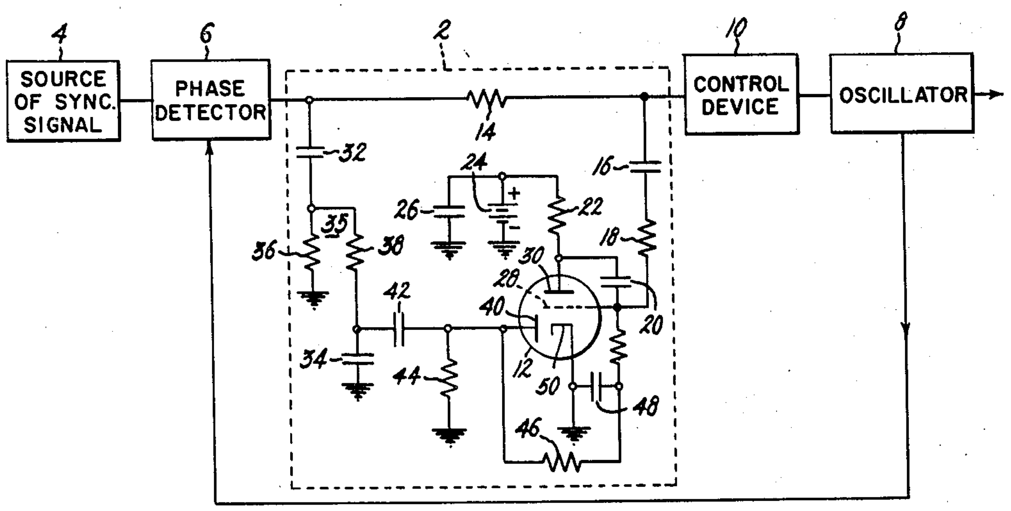
INVENTOR:
WOLF J. GRUEN,
BY Donald H. Timlie
HIS ATTORNEY.

United States Patent Office 2,828,419

Patented Mar. 25, 1958

2,828,419

AUTOMATIC FREQUENCY CONTROL SYSTEM

Wolf J. Gruen, Los Angeles, Calif., assignor to General Electric Company, a corporation of New York Application October 11, 1954, Serial No. 461,419

8 Claims. (Cl. 250—36)

This invention relates to improvements in automatic frequency and phase control systems.

Such systems usually include a phase detector adapted to receive synchronizing signals, an oscillator to be synchronized, means for coupling reference signals indicative of the phase and frequency of an oscillator to the phase detector and means for controlling the phase and frequency of the oscillator in accordance with the error signal appearing at the output of the phase detector.

It is desirable in many applications that the time required to pull the oscillator into synchronism be minimized. It is also generally desirable for the system to have wide pull-in range, i. e. to be capable of pulling the oscillator into synchronism when its frequency differs greatly from the frequency of the synchronizing signals. The optimum time for pulling the oscillator into synchronism and the desired pull-in range can be achieved by increasing the bandwidth of the system.

However, increasing the bandwith of the system permits a wider spectrum of noise voltages to be present in the system when the system is in synchronism. These noise voltages cause the oscillator to shift its phase as the noise voltages are indistinguishable from the useful error signal provided by the phase detector. In some applications such shifts in phase do not produce deleterious effects. There are applications, however, where shifts in phase caused by noise have harmful effects. For example, such shifts in phase of the color oscillator in color television receivers designed for use in the recently standardized color television system causes variegated color patterns to appear on the screen. Of course, the bandwidth may be reduced so as to reduce the effects produced by noise, but this increases the time for pulling the oscillator into synchronism to an intolerable degree. Therefore, the best that can be done in accordance with the teachings of the prior art is to select a bandwidth that compromises between rapid pull-in on the one hand and noise effects on the other.

It is an object of this invention to provide an improved automatic frequency and phase control system.

It is another object of this invention to provide an automatic frequency and phase control system that operates in an improved manner in the presence of noise.

It is another object of this invention to provide an automatic frequency and phase control system that has a wide bandwidth during pull-in and a narrow bandwith when synchronization is attained.

It is another object of this invention to provide an automatic frequency and phase control system that has a wide bandwidth during pull-in and a narrow bandwidth when in a synchronized condition and which continues to operate at the narrow bandwidth in the presence of noise having a relatively high average energy.

Briefly, these objectives may be attained in the following manner: A circuit is provided for reducing the effective bandwidth of the system in response to a synchronized condition. The circuit is provided with a threshold such that noise present in the circuit when the system is synchronized cannot make the circuit revert to wide band operation until the integrated value of the noise within a given period reaches a relatively high value. When such a high level of noise is present, there is generally too much noise for satisfactory operation of the equipment in which the automatic frequency and phase control system is used.

The invention will be better understood after the following discussion of the drawing which is a combined schematic and block diagram of an embodiment of the invention in which the shift in the bandwidth of the automatic phase and frequency control system is controlled by an auxiliary detector.

It will be apparent to one skilled in the art that except for the transfer or translating network contained within the dotted rectangle 2, the automatic frequency and phase control system is similar to those of the prior art. Synchronizing signals of any suitable forms, which may include pulses, continuous waves or bursts of alternating current waves are coupled from their source 4 to an input of a phase detector 6. A voltage wave indicative of the frequency and phase of an oscillator 8, that is to be brought into synchronism with the synchronizing signals, is derived from the oscillator or associated circuitry and coupled to another input of the phase detector 6. For example, as will be readily apparent to those skilled in the art, if the oscillator 8 were of the self-blocking type, or were a multivibrator, known means might be provided for developing a sawtooth or other shape of wave from the oscillator output. This wave would be indicative of the phase and frequency of the oscillator. In any case the wave derived from the oscillator may be considered a reference wave indicative of the phase and frequency of the oscillator. The output of the phase detector contains the beat between the synchronizing signal and the reference wave and is coupled via the translating network 2 to a control device 10 that operates to change the phase and frequency of the oscillator 8 in a well-known manner. For example, the control device might be a reactance tube coupled to the oscillator in a manner understood by those skilled in the art.

Turning now to the translating network 2, it will be observed that the network includes a tube 12 having a diode section and a triode section. It will be apparent to those skilled in the art that a separate diode or rectifier and a separate triode could be used. When the triode section of the tube 12 is not conducting, the highest frequency transmitted by the signal translating circuit 2, between the phase detector 6 and the control device 10, is effectively determined in the particular embodiment of the invention by a resistor 14, connected in series between the output of the phase detector 6 and the control device 10, and a series circuit comprised of a capacitor 16, a resistor 18, a capacitor 20, a plate load resistor 22 and a power supply, here shown as including a battery 24 and the usual bypass capacitor 26. The circuitry connected at the junction of the output of the phase detector 6 and the resistor 14 is of such nature as to have no substantial loading effect on the control loop. The same is true for the impedance network connected on the side of the grid 28 opposite to the capacitor 20. The values of the various components of the series circuit are such as as to present substantial impedance for the highest beat frequency to be applied to the input of the control device 10.

When the triode section of the tube 12 conducts, the impedance of the capacitor 20 and the plate load resistor 22 for the plate 30 is effectively reduced, for reasons well known to those skilled in the art, by a factor that is proportional to the gain of the triode section. The most significant effect of the conduction of the triode section of the tube 12 is to decrease the effective impedance in the path between the grid 28 and ground.

Accordingly, the upper frequency response of the translating network 2 as a whole is reduced and the system operates in a narrow band condition. Thus, when the triode section of the tube 12 conducts, the automatic frequency control system is operating in a narrow band condition, and when the tube 12 is not conducting, the system is in a wide band condition. The diode and triode may be thought of as a switch for shifting the bandwidth of the system between two conditions of operation, one a narrow band condition and the other a wide band condition.

The conduction of the triode section of the tube 14 is controlled in the following manner: A band-pass filter, generally indicated by the numeral 35, formed by capacitors 32, 34 and the resistors 36, 38 may be connected between the output of the phase detector 6 and the plate 40 of the diode section of the tube 12 with the aid of a coupling network formed by a coupling capacitor 42 and a resistor 44. The upper frequency limit of the filter 35 is preferably made equal to the widest frequency divergence between the oscillator 8 and the synchronizing signals for which pull-in is to be effected. Although such a limit to the upper frequency of the filter 35 is not absolutely essential, it is helpful as it prevents noise voltages having frequency components above the pull-in range from controlling the conduction of the triode section of the tube 12. The lower frequency limit is set at such a frequency as not to prevent the oscillator from being pulled into synchronism. This point will be further explained below.

The diode section of the tube 12 rectifies the beat frequencies which are passed by the band-pass filter 35 to its plate 40. The diode may be thought of as an auxiliary detector. The load circuit for the diode is a smoothing filter comprised, in this particular embodiment of the invention, of a resistor 46 and a capacitor 48 connected in series between the plate of the diode and the common cathode 50 of the tube 12. When the rectified output of the diode is of sufficient amplitude, conduction in the triode section of the tube 12 is cut off. The requirement of a predetermined bias for cutting off the triode section of the tube 12 provides the desired threshold of operation.

The overall operation is as follows: When the oscillator 10 is not in synchronism, and before there is time for the diode to build up sufficient voltage to cut off the triode, the system operates as a narrow band system. However, after a time primarily determined by the time constant of the smoothing network, the rectified output of the diode is sufficient to cut off the triode and the system operates as a wide band system. Then follows a period during which the oscillator is pulled toward synchronism with the synchronizing signals. When the beat frequency between the synchronizing signal and the oscillator signal or the signal derived from the oscillator becomes less than the low-frequency cut-off point of the band-pass filter 35, the beat frequency energy no longer reaches the plate 40 of the diode section of the tube 12. If it were not for the holding action of the smoothing filter 46, 48, the cut-off bias on the triode section of the tube 12 would be immediately removed with the result that the automatic frequency control loop would go into narrow band operation. If the beat frequency at this junction lies outside of the pull-in range of the loop when it is operating under narrow band conditions, it can be seen that the system would not pull into synchronism. However, the time constant of the smoothing filter 46, 48, can be adjusted, in accordance with principles well known to those skilled in the art, so as to maintain the triode section of the tube 12 in its cut-off condition until synchronization is fully effected.

Furthermore, a distinct advantage of the invention lies in the fact that low-frequency noise components that are present during the synchronized condition cannot throw the system into wide band operation until their rectification by the diode section of the tube 12 produces an output voltage equal to the cut-off potential of the triode section of the tube 12. The triode section can have a cut-off potential such that when the noise has sufficient energy to cause the diode section to produce it, the signals at other parts of the equipment, in which the invention is used, are no longer usable. Hence, a threshold or delay is provided in the system that prevents noise below a predetermined energy level from disturbing the narrow band operation of the automatic frequency control system.

Another purpose of the smoothing filter 46, 48, is to prevent any frequencies in the translating network 2, such as may be caused by transients, from reaching the control device 10 that would be high enough to shift the phase of the oscillator 8 at a rate faster than the automatic frequency control system can follow. If this occurred, there is a possibility that the oscillator 8 might be forced out of synchronism. The system would tend to pull the oscillator into synchronism again until another transient forced the oscillator out of synchronism. This sequence of events would be repetitive.

The following considerations are of interest with respect to the characteristics of the band-pass filter 35. It will be readily appreciated by those skilled in the art that the upper frequency limit of the band-pass characteristic of the band-pass filter 35 may be incorporated in the design of the phase detector 6 in which event the filter 35 may be a high pass filter having a predetermined low-frequency cut-off point.

Although this invention is of general utility in automatic frequency control systems, it has been found to operate in a highly successful manner in a color television receiver adapted to function in response to signals transmitted in response to the recently standardized color television system described in the January 1954 edition of the I. R. E.

While I have illustrated a particular embodiment of my invention, it will of course be understood that I do not wish to be limited thereto since various modifications both in the circuit arrangement and in the instrumentalities may be made, and I contemplate by the appended claims to cover any such modifications as fall within the true spirit and scope of the invention.

What I claim as new and desire to secure by Letters Patent of the United States is:

1. An automatic frequency control system comprising, in combination, a phase detector adapted to receive synchronizing signals, an oscillator to be synchronized with said signals, a circuit for coupling a signal indicative of the phase of said oscillator to said phase detector, a control device coupled to said oscillator and adapted to control its phase and frequency in response to an error voltage, a transfer network connected between the output of said phase detector and the input of said control device so as to couple at least portions of the error voltage appearing at the output of said phase detector to the input of said control device, said transfer circuit having first and second conditions of operation, said first condition of operation being such that a given band of frequencies appearing at the output of said phase detector are coupled to said control device, said second condition of operation being such that a band of frequencies less than said given band is coupled from the output of said phase detector to said control device, said transfer circuit having circuit components for switching the condition of operation of said transfer network from said first condition to said second condition of operation after a synchronous condition is established, said latter circuit having an operating characteristic such that is it prevented from causing a reversion from the second condition of operation to the first condition until the integrated value of the signals applied to it is above a predetermined level.

2. An automatic frequency control system comprising, in combination, a phase detector, an oscillator, circuitry for coupling said oscillator to said phase detector, a control device coupled to said oscillator and adapted to control the phase and frequency of said oscillator in response to an error signal, a transfer network coupled between the output of said phase detector and the input of said phase control device, said transfer circuit including a rectifier, circuits for coupling the input of said rectifier to the output of said phase detector, a load circuit for said rectifier, said network also including passive elements forming a wide band filter, an amplifier having a grid and a plate coupled to at least some of said passive elements in such manner that conduction of said amplifier reduces the effective high-frequency impedance of said passive elements, and connections for applying the rectified voltage appearing across said load circuit to said amplifier as a bias in such polarity as to tend to cut off conduction therein, said amplifier being such as to require a predetermined bias voltage before cut-off is reached, thus preventing noise components appearing at the output of said phase detector when said oscillator is in a substantially synchronous condition from cutting off said amplifier and thus causing said transfer network to have a wide bandwidth.

3. An automatic frequency control system as described in claim 2 wherein a band-pass filter is connected between the output of said phase detector and the input of said rectifier.

4. An automatic frequency control system comprising, in combination, a phase detector having two input circuits and an output circuit, one of said input circuits being adapted to receive synchronizing signals, an oscillator, a circuit for coupling an output of said oscillator to the other input circuit of said phase detector, a control device connected to said oscillator in such manner as to control its phase and frequency, a resistor connected between the output of said phase detector and said control device, an amplifier having a plate, a grid and a cathode, a source of fixed potential, a plate load resistor connected between one side of said source of fixed potential and said plate, a connection between said cathode and the other side of said source of fixed potential, a capacitor connected between said plate and said grid, and a resistor and another capacitor connected between said grid and the input of said phase control device, a resistor and a capacitor connected in series between said grid and said cathode, a diode formed by a plate and said cathode, a resistor connected between the plate of said diode and the junction of the capacitor and resistor that are connected between said grid and said cathode, and a circuit coupling the output of said phase detector to the plate of said diode.

5. An automatic frequency control system as described in claim 4 wherein the circuit coupling the output of said phase detector to the plate of said diode is a band-pass filter.

6. An automatic frequency control system that operates in a wide band condition during pull-in and in a narrow band condition when in synchronism and which maintains the narrow band condition even in the presence of relatively large amounts of noise comprising an oscillator, phase detecting means, a circuit for coupling the output of said oscillator to said phase detecting means, a phase and frequency control device coupled to said oscillator, said phase detecting means being adapted to receive synchronizing signals and to produce a beat between the output of said oscillator and the synchronizing signal, a transfer network coupled between said phase detecting means and said control device, said transfer network including a switching circuit for shifting the bandwidth of said transfer network from a wide frequency spectrum to a relatively narrow band spectrum, said switching circuit being operative to make the shift from a wide frequency spectrum to a narrow frequency spectrum in response to an output of said phase detecting means that is produced when the oscillator is in synchronism.

7. An automatic frequency control system comprising phase detecting means, an oscillator, a circuit coupling the output of said oscillator to said phase detecting means, a control device coupled to said oscillator, a transfer network coupled between said phase detecting means and said control device, a circuit included in said transfer network and responsive to voltages appearing at the output of said phase detecting means and having an energy level less than a predetermined average energy level to maintain the bandwidth of said transfer network in a relatively narrow bandwidth condition of operation.

8. An automatic frequency control system comprising: a phase detector; an oscillator; leads for conducting the output of said oscillator to an input of said phase detector; a control device for controlling the frequency of the output of said oscillator in response to an input signal; and a transfer network coupled between the output of said phase detector and the input of said control device, said transfer network comprising: filter means for passing to said control device only a certain range of frequencies in the output of said phase detector, and means responsive to the integrated value of the output of said phase detector for operating on said filter means to reduce the range of passed frequencies when said integrated value is below a predetermined level.

References Cited in the file of this patent

UNITED STATES PATENTS

| | | |
|---|---|---|
| 2,280,563 | Weinberger | Apr. 21, 1942 |
| 2,301,620 | Fowler | Nov. 10, 1942 |
| 2,332,540 | Travis | Oct. 26, 1943 |
| 2,676,262 | Hugenholtz | Apr. 20, 1954 |
| 2,704,324 | Broadhead | Mar. 15, 1955 |
| 2,764,686 | Luther | Sept. 25, 1956 |